(12) United States Patent
Jacobsen

(10) Patent No.: US 11,361,350 B2
(45) Date of Patent: Jun. 14, 2022

(54) SYSTEM AND METHOD FOR RECORDING, COMPILING AND DISPLAYING USER REVIEWS OF A PRODUCT

(71) Applicant: Eric Jacobsen, Salt Spring Island (CA)

(72) Inventor: Eric Jacobsen, Salt Spring Island (CA)

( * ) Notice: Subject to any disclaimer, the term of this patent is extended or adjusted under 35 U.S.C. 154(b) by 613 days.

(21) Appl. No.: 16/415,752

(22) Filed: May 17, 2019

(65) Prior Publication Data
US 2019/0355028 A1 Nov. 21, 2019

Related U.S. Application Data

(60) Provisional application No. 62/673,063, filed on May 17, 2018.

(51) Int. Cl.
| | |
|---|---|
| *G06Q 30/02* | (2012.01) |
| *G06Q 10/06* | (2012.01) |
| *G06F 16/9038* | (2019.01) |
| *G06F 3/0354* | (2013.01) |

(52) U.S. Cl.
CPC ..... *G06Q 30/0282* (2013.01); *G06F 16/9038* (2019.01); *G06Q 10/06395* (2013.01); *G06F 3/03543* (2013.01); *G06F 3/03545* (2013.01); *G06F 3/03547* (2013.01)

(58) Field of Classification Search
None
See application file for complete search history.

(56) References Cited

U.S. PATENT DOCUMENTS

| | | | |
|---|---|---|---|
| 8,538,770 B2 | 9/2013 | Papier et al. | |
| 9,632,069 B2 | 4/2017 | Jackson, Jr. et al. | |
| 9,710,158 B2* | 7/2017 | Ohki | G06F 3/0488 |
| 9,747,424 B2 | 8/2017 | Sablinski | |
| 10,773,917 B1* | 9/2020 | Irizarry | B65H 29/70 |
| 2010/0286993 A1 | 11/2010 | Lovelace | |
| 2011/0248837 A1* | 10/2011 | Israr | G06F 3/016 |
| | | | 340/407.1 |

(Continued)

FOREIGN PATENT DOCUMENTS

| | | |
|---|---|---|
| WO | 2014105752 | 7/2014 |
| WO | 2017106770 | 6/2017 |
| WO | 2017122201 | 7/2017 |

*Primary Examiner* — William L Bashore
*Assistant Examiner* — Nathan K Shrewsbury
(74) *Attorney, Agent, or Firm* — McMillan LLP

(57) ABSTRACT

A computer-implemented method and system for recording, compiling and displaying user reviews of a consumable product. The method comprising providing a user display graph on a user device, the user display graph having an x-axis and a y-axis with a baseline extending from the y-axis along the x-axis wherein the x-axis is divided into a plurality of review categories, detecting a user input from an input device within the user display graph on the user device and tracking the movement of the user input on the user device along a path through the plurality of review categories. The method further comprises measuring a plurality of review points on the path wherein each of the plurality of review points is located within one of the plurality of review categories, displaying a profile line connecting the plurality of review points along the path, and displaying numerical values representing each of the plurality of review points within each of the plurality of review categories.

19 Claims, 6 Drawing Sheets

(56) References Cited

U.S. PATENT DOCUMENTS

| | | | |
|---|---|---|---|
| 2013/0226820 A1* | 8/2013 | Sedota, Jr. | H02J 7/0042 |
| | | | 705/347 |
| 2014/0278835 A1 | 9/2014 | Moseson | |
| 2014/0351079 A1* | 11/2014 | Dong | G06Q 30/0282 |
| | | | 705/26.7 |
| 2016/0055236 A1 | 2/2016 | Frank et al. | |
| 2016/0086247 A1 | 3/2016 | Kilts | |
| 2016/0098848 A1 | 4/2016 | Zamanakos et al. | |
| 2016/0171164 A1 | 6/2016 | Kinzer | |
| 2017/0019496 A1 | 1/2017 | Orbach | |
| 2017/0173262 A1 | 6/2017 | Veltz | |
| 2019/0019230 A1* | 1/2019 | Constantinides | H04L 67/18 |
| 2019/0205402 A1* | 7/2019 | Sernau | G06N 3/0454 |
| 2019/0214005 A1* | 7/2019 | Abdallah | H04L 67/22 |
| 2019/0220523 A1* | 7/2019 | Choi | G06F 16/9536 |
| 2019/0354238 A1* | 11/2019 | Akhbari | G06N 3/08 |
| 2019/0355028 A1* | 11/2019 | Jacobsen | G06Q 10/06395 |

* cited by examiner

SYSTEM AND METHOD FOR RECORDING, COMPILING AND DISPLAYING USER REVIEWS OF A PRODUCT

CROSS REFERENCE TO RELATED APPLICATION

This application claims priority to U.S. Provisional Patent Application No. 62/673,063 filed May 17, 2018 entitled System and Method for Recording, Compiling and Displaying User Reviews of a Consumable Product.

BACKGROUND OF THE INVENTION

1. Field of Invention

The present invention relates generally to a system and method for recording, compiling and displaying user reviews of a consumable product, and more particularly to a computer system utilizing a digital user device to receive, compile and display a plurality of user reviews in a plurality of categories for each consumable product through an interactive graphical interface.

2. Description of Related Art

When making a decision to purchase an item, many consumers will refer to public ratings and reviews prior to completing their purchase. Additionally, consumers may track past purchases through personal ratings and reviews to look back at in the future when making further purchase decisions. A consumer may track this information manually on paper, within a computer program such as a word processor or spreadsheet, or within a mobile app or website specifically designed to record, retain and compare product reviews.

Typically, programs, mobile apps or websites designed to record ratings are limited to a single numerical rating (for example, rated out of 5 stars) with an optional associated written comment for each product. Where there are multiple reviewable categories for a product, each category may display an individual numerical or star rating, with the compilation of ratings displayed in a table or list. With multiple reviewable categories, the user must also rate each category individually, selecting each rating value independently. Recording multiple category ratings for each product can be slow and tedious for a user. As well, when referring to previously recorded reviews with multiple categories per product, it can be time consuming to refer to and compare each product review.

SUMMARY OF THE INVENTION

According to a first embodiment of the present invention there is disclosed a computer-implemented method for recording, compiling and displaying user reviews of a consumable product comprising providing a user display graph on a user device divided into a plurality of review categories, detecting a user input from an input device within the user display graph on the user device and tracking the movement of the user input on the user device along a path through the plurality of review categories. The method further comprises measuring a plurality of review points on the path wherein each of the plurality of review points is located within one of the plurality of review categories, displaying a profile line connecting the plurality of review points along the path.

The method may further comprise displaying numerical values representing each of the plurality of review points within each of the plurality of review categories. The user display graph may have an x-axis and a y-axis with a baseline extending from the y-axis along the x-axis wherein the x-axis.

The user device may comprise a touch-activated user device. The input device may be selected from a group consisting of user finger and stylus. The input device may be selected from a group consisting of mouse, digitizer, touchpad, pointing stick, joystick, tracking ball and light pen.

The baseline may extend from a midpoint of the y-axis. The plurality of review points may be located at a midpoint of each of the plurality of review categories along the x-axis intersecting the path. Each of the numerical values may correspond to a distance from the baseline to each of the plurality of review points. Each of the plurality of review points may be adjustable by detecting the user input at a location on the profile line corresponding to one of the plurality of review points and tracking movement of the user input parallel to the y-axis relative to the baseline so as to adjust the profile line.

The method may further comprise receiving an inputted consumable product identity, storing the consumable product identity and the plurality of review points within a database wherein the database includes for each consumable product, the consumable product identity and a plurality of user review points from a plurality of users for each of the plurality of review categories, utilizing a processing circuit to generate an average review profile line for each consumable product of all of the plurality of user review points for each of the plurality of review categories, and displaying the average review profile line on the touch-activated user device.

The method may further comprise displaying a range for each consumable product corresponding to all of the plurality of user review points for each of the plurality of review categories. The range may extend between minimum and maximum values of the plurality of user review points for each of the plurality of review categories. The range may be calculated as a standard deviation of the plurality of user review points for each of the plurality of review categories.

The user device may be configured to connect with the processing circuit through a network. The consumable product identity may be selected from a plurality of consumable product identities stored within the database. The database may be searchable. The database may be searchable by the product identity. The database may be searchable by the average review profile line.

According to a further embodiment of the present invention there is disclosed a computer-implemented system for recording, compiling and displaying user reviews of a consumable product comprising a user device, an input device, a CPU, a network connection, a database storing a plurality of consumable product identities and a plurality of corresponding user review points from a plurality of users for each of a plurality of review categories. The user device is in communication with the CPU. The CPU is configured to access the database. The user device is configured to display a user display graph divided into a plurality of review categories. The user device is configured to detect and track user input movement on the input device along a path within the user display graph. The CPU is configured to measure a plurality of review points on the path wherein each of the plurality of review points is located within one of the plurality of review categories. The CPU is configured to generate a profile line connecting the plurality of review points along the path and to display the profile line on the touch-activated user device.

The CPU may be configured to generate numerical values representing each of the plurality of review points within each of the plurality of review categories and to display the numerical values on the touch-activated user device. The user display graph may have an x-axis and a y-axis with a baseline extending from the y-axis along the x-axis wherein the x-axis The system may further comprise a network connection. The user device may be in communication with the CPU through the network connection.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
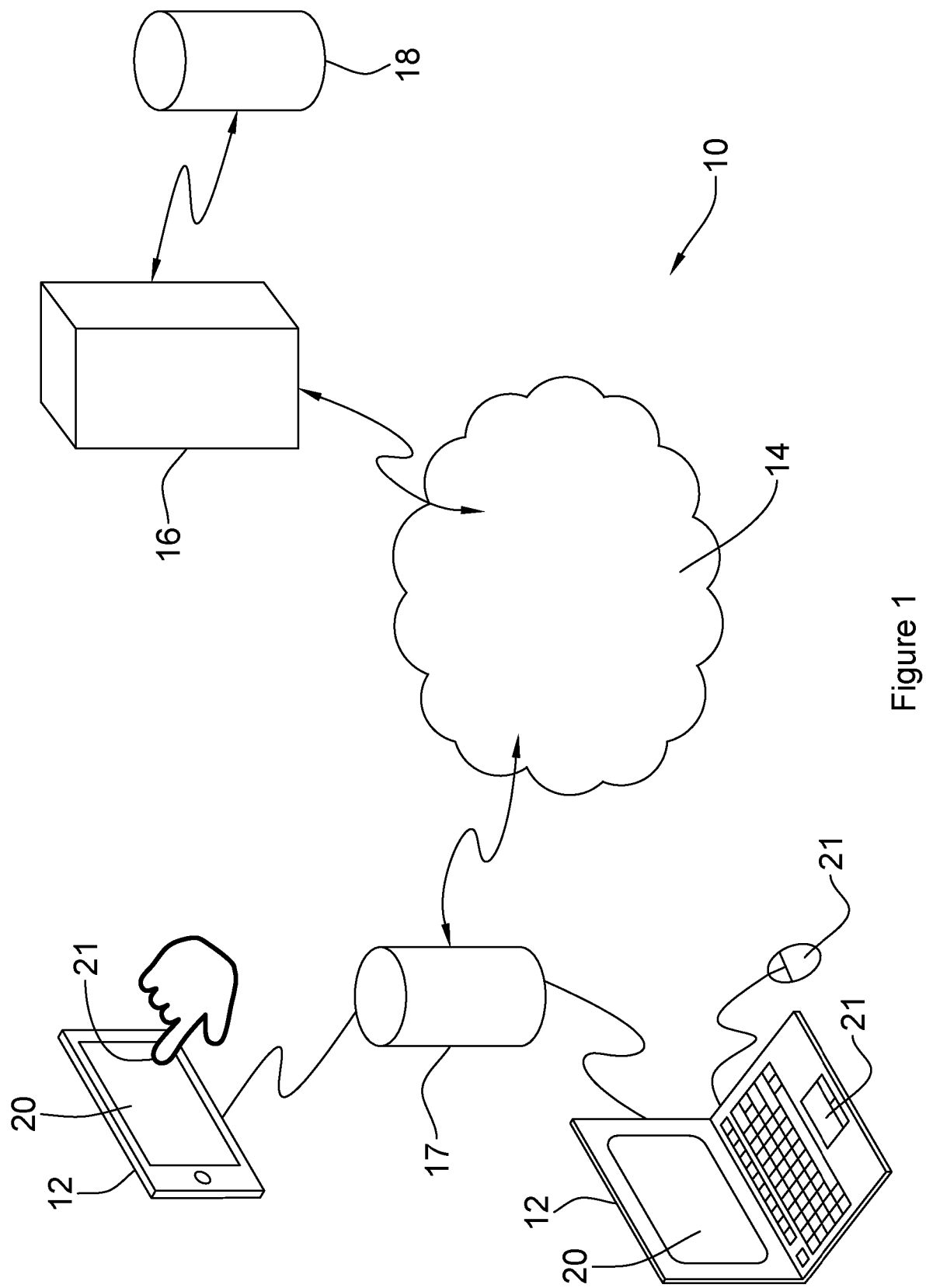
FIG. 1 is an illustration of a computer-implement system for recording, compiling and displaying user reviews of a consumable product according to a first embodiment of the present invention.

Referring to FIG. 1, a computer-implemented system for recording, compiling and displaying user reviews of a consumable product according to a first embodiment of the invention is shown generally at 10. The system 10 comprises a user device 12 having a first database 17, a network 14 and a system server or CPU 16 connected to at least one second database 18. The first database 17 contains a plurality of user reviews for an individual user. The second database 18 contains a plurality of user reviews for a plurality of users, as will be further set out below. The first database 17 updates the records in the second database 18 through the network 14. The network 14 is operable to transmit communications between the user device 12 and the CPU 16. It will be appreciated that the user device 12 includes a display 20 and may be any commonly known user device, such as, by way of non-limiting example, a tablet, a laptop computer, smartphone, PDA, ultra-mobile PC (UMPC), desktop computer, server, etc. The user device 12 may utilize any known input device 21 such as, by way of non-limiting example, a finger or stylus on a touch-activated display, mouse, digitizer, touchpad, pointing stick, joystick, tracking ball and light pen. It will be understood that the architecture herein is provided for example purposes only and does not limit the scope of the various implementations of the communications systems and methods. As will be further described below, the user device 12 is adapted to receive an inputted product identifier (ID) for a consumable product with a user review to store in the first database 17 and to receive user reviews for a plurality of product IDs from a plurality of users contained within the second database 18 and to display corresponding review profile lines on the display 20. It will be appreciated that a consumable product may include such as, by way of non-limiting example, food products, beverages such as soda, wine, beer or other alcoholic or non-alcoholic beverages, and inhalable products such as tobacco, cannabis or e-cigarettes.

Figure 2:
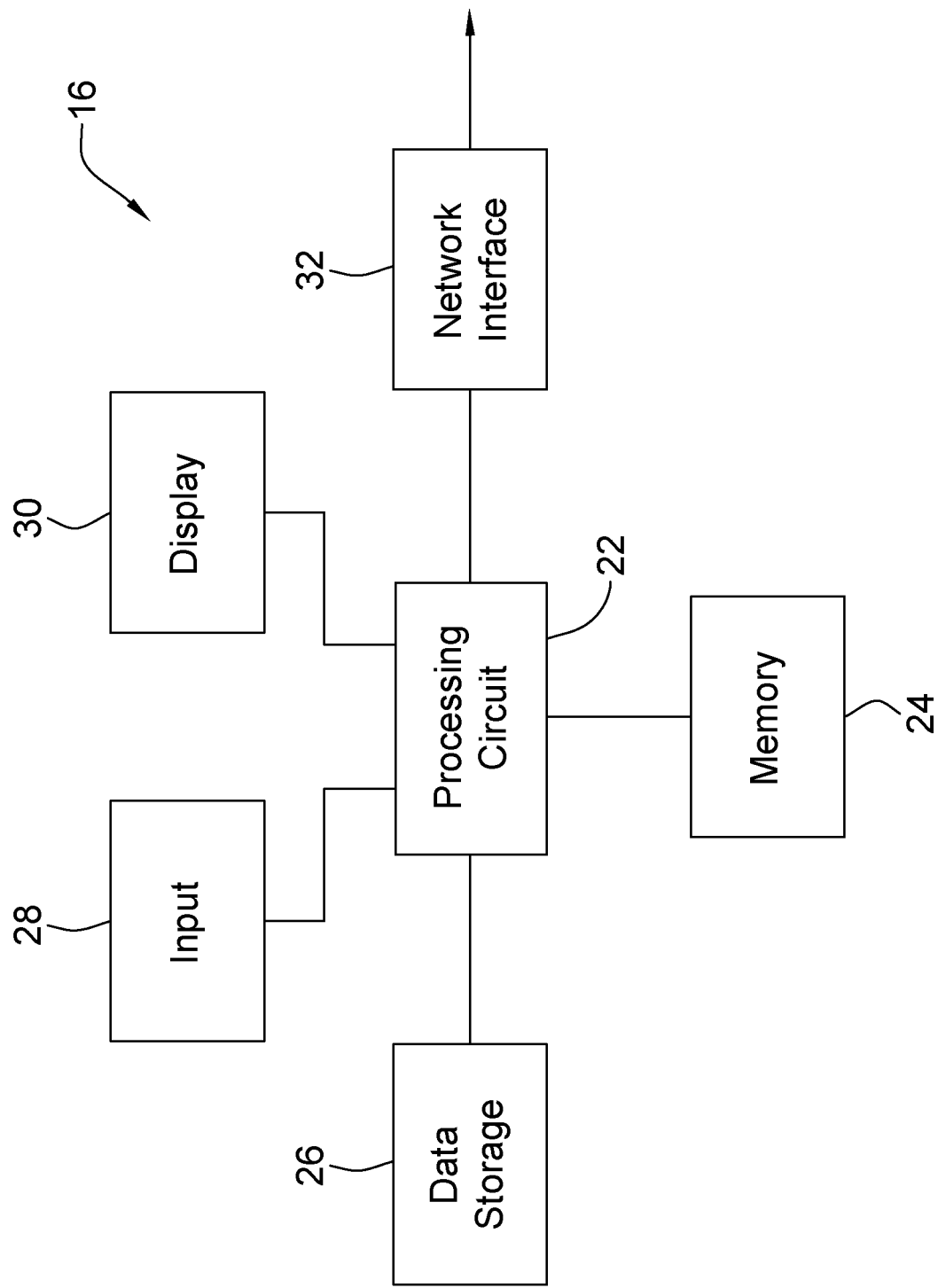
FIG. 2 is a block diagram of the CPU of the system of FIG. 1.

Turning now to FIG. 2, the CPU 16 comprises a processing circuit 22, and memory 24 that stores machine instructions that, when executed by the processing circuit 22, cause the processing circuit 22 to perform one or more of the operations and methods described herein. The processing circuit 22 may optionally contain a cache memory unit for temporary local storage of instructions, data, or computer addresses. The CPU 16 further includes a data storage 26 of any conventional type operable to store information such as an inputted product ID and review profile and may optionally include an input 28 and display 30 for receiving and displaying inputs from a database manager or user. As illustrated in FIG. 2, the CPU 16 also includes a network interface 32 such as a radio transmitter, ethernet adapter or the like for providing communication between the processing circuit 22 and the second database 18 and/or user devices 12 as illustrated in FIG. 1.

More generally, in this specification, the term "processing circuit" is intended to broadly encompass any type of device or combination of devices capable of performing the functions described herein, including (without limitation) other types of microprocessing circuits, microcontrollers, other integrated circuits, other types of circuits or combinations of circuits, logic gates or gate arrays, or programmable devices of any sort, for example, either alone or in combination with other such devices located at the same location or remotely from each other. Additional types of processing circuit(s) will be apparent to those ordinarily skilled in the art upon review of this specification, and substitution of any such other types of processing circuit(s) is considered not to depart from the scope of the present invention as defined herein. In various embodiments, the processing circuit 22 can be implemented as a single-chip, multiple chips and/or other electrical components including one or more integrated circuits and printed circuit boards.

Computer code comprising instructions for the processing circuit(s) to carry out the various embodiments, aspects, features, etc. of the present disclosure may reside in the memory 24. The code may be broken into separate routines, products, etc. to carry forth specific steps disclosed herein. In various embodiments, the processing circuit 22 can be implemented as a single-chip, multiple chips and/or other electrical components including one or more integrated circuits and printed circuit boards. The processing circuit 22 together with a suitable operating system may operate to execute instructions in the form of computer code and produce and use data. By way of example and not by way of limitation, the operating system may be Windows-based, Mac-based, or Unix or Linux-based, among other suitable operating systems. Operating systems are generally well known and will not be described in further detail here.

Memory 24 may include various tangible, non-transitory computer-readable media including Read-Only Memory (ROM) and/or Random-Access Memory (RAM). As is well known in the art, ROM acts to transfer data and instructions uni-directionally to the processing circuit 22, and RAM is used typically to transfer data and instructions in a bi-directional manner. In the various embodiments disclosed herein, RAM includes computer program instructions that when executed by the processing circuit 22 cause the processing circuit 22 to execute the program instructions described in greater detail below. More generally, the term "memory" as used herein encompasses one or more storage mediums and generally provides a place to store computer code (e.g., software and/or firmware) and data that are used by the user device 12. It may comprise, for example, electronic, optical, magnetic, or any other storage or transmission device capable of providing the processing circuit 22 with program instructions. Memory 24 may further include a floppy disk, CD-ROM, DVD, magnetic disk, memory chip, ASIC, FPGA, EEPROM, EPROM, flash memory, optical media, or any other suitable memory from which processing circuit 22 can read instructions in computer programming languages.

Figure 3:
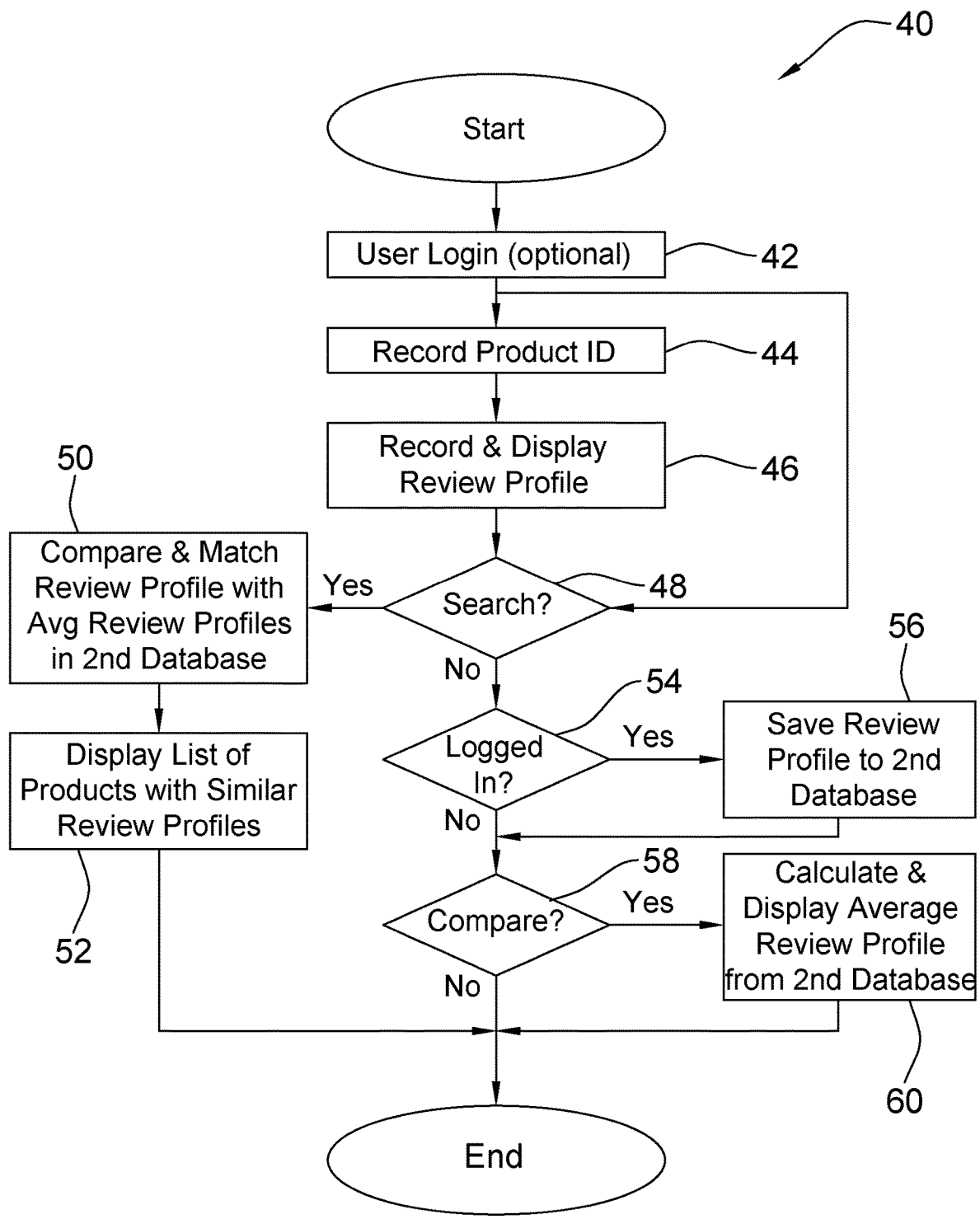
FIG. 3 is a flowchart of computer steps for recording, compiling and displaying user reviews using the system of FIG. 1.

As set out above, the CPU 16 is configured to receive an inputted product ID and a user review from the user device 12 and to generate a user review profile line for presentation on the display 20. In particular, as illustrated in FIG. 3, a method of recording, compiling and displaying user reviews of a consumable product for use in the above system is illustrated generally at 40.

The method comprises receiving an optional inputted user login at step 42. The system may be used without logging in, in which case the user review will be saved to the first database 17 but the user review will not be saved to the second database 18, as will be set out below. The login step includes verification of the user ID, which may comprise any known user authentication, such as, by way of non-limiting example, identification code and password, biometrics or any other known method of verifying the identity of the user. Prior to step 44 a search may optionally be performed, as will be set out below. At step 44 a consumable product ID is received. In the case where a product profile search is to be performed, the consumable product ID is not always necessary, as will be set out below. The product ID is necessary when recording a product review. It will be appreciated that the method of permitting a user to input the product ID may be by any conventional means, such as, by way of non-limiting example, typed in, selected from a pull-down menu, scanned by a QR code scanner, or by uploading a photo of the product packaging. The product ID may include information such as, by way of non-limiting example, the product name, a product identification code, point of sale reference, manufacturer reference or chemical analysis data.

A review profile is recorded to the first database 17 and presented on the display 20 at step 46, as will be set out in further detail below. At step 48 it is confirmed whether to proceed with a search. A search may be performed with or without a product ID entered at step 44. If no product ID was entered at step 44 then a search is performed at step 50 utilizing a search review profile recorded in a similar method as set out at step 46. In particular, the search may be performed to located profiles corresponding to a particular shape or type, such as, by way of non-limiting example, a bell curve, check mark or sine wave across the review categories 88. In particular, if a product ID was entered at step 44, then the system may search in step 50 for other products having similar profiles. The system accesses the second database 18 through the network 14 to compare the search review profile with the average review profiles of a plurality of reviews stored within the second database 18. A list of product IDs with similar review profiles is presented on the display 20 at step 52. It will be appreciated that an exact match to the search review profile may not be located within the second database 18, in which case a best match sort order algorithm is used to display product IDs and their corresponding review profiles, as is commonly known in the art. It will be appreciated that it is also possible to perform a search for a specific product ID, in which case it is not necessary to record a review profile prior to performing the search of the second database 18. The user may save the product IDs for future reference within the first database 17 of any products of interest found by searching, similar to a wish list, as is commonly known.

If a product ID search is not performed following step 48, the method continues to step 54 where a verification is completed to determine if the user logged in at step 42. If the user is logged in, then the review profile recorded to the first database 17 at step 46 is saved to the second database 18 at step 56. At step 58 the user may select the option to compare the review profile recorded at step 46 with an average review profile calculated from a plurality of user review profiles stored within the second database 18. The average review profile is calculated and displayed at step 60. The average review profile is displayed with the recorded review profile for comparison and may be displayed as a single review profile line or it may be displayed as a review profile line with a range of review profiles displayed graphically therewith, as will be set out further below.

Figure 4:
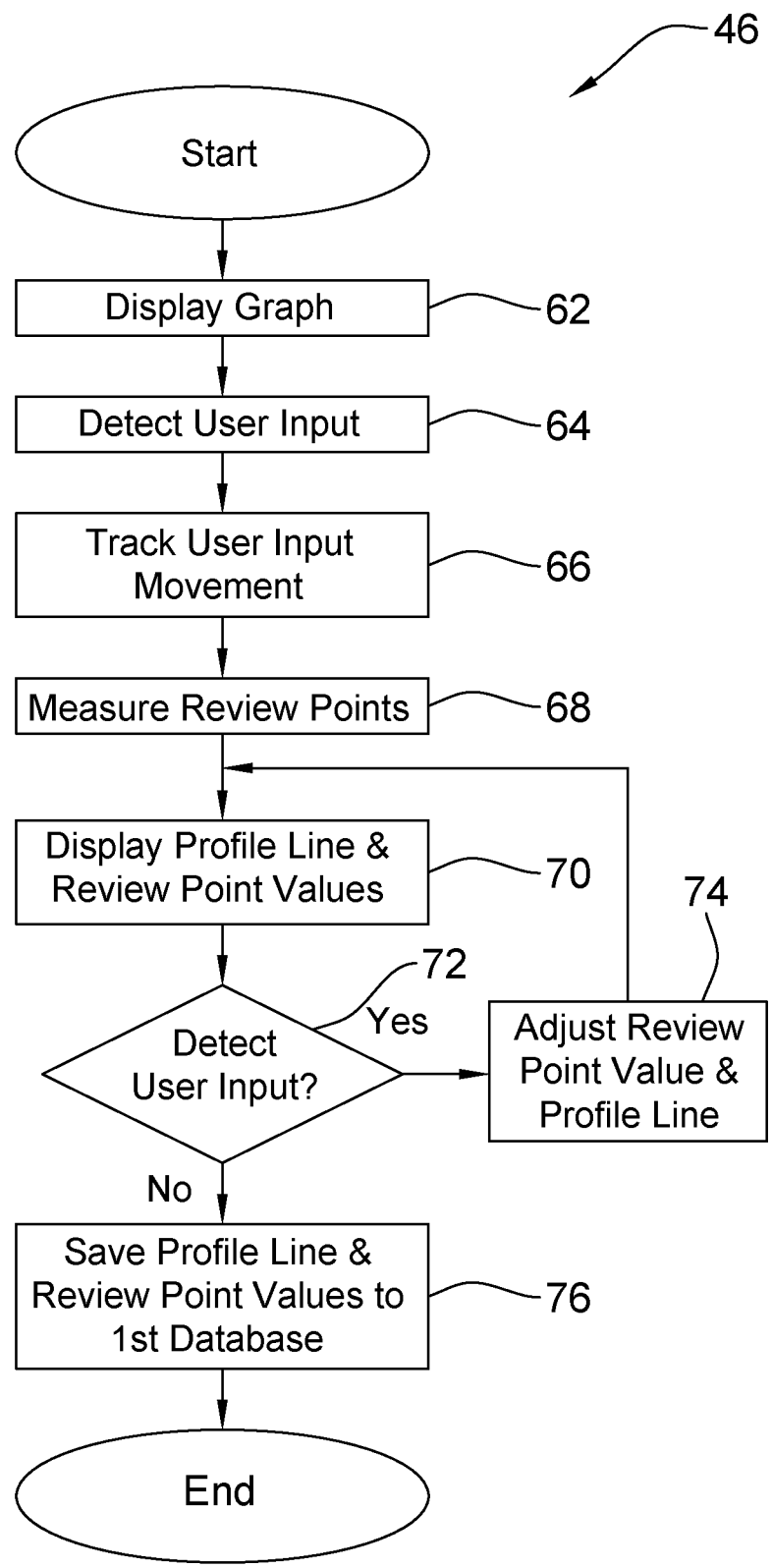
FIG. 4 is a flowchart of computer steps for recording a user review profile line using the system of FIG. 1.
Figure 5:
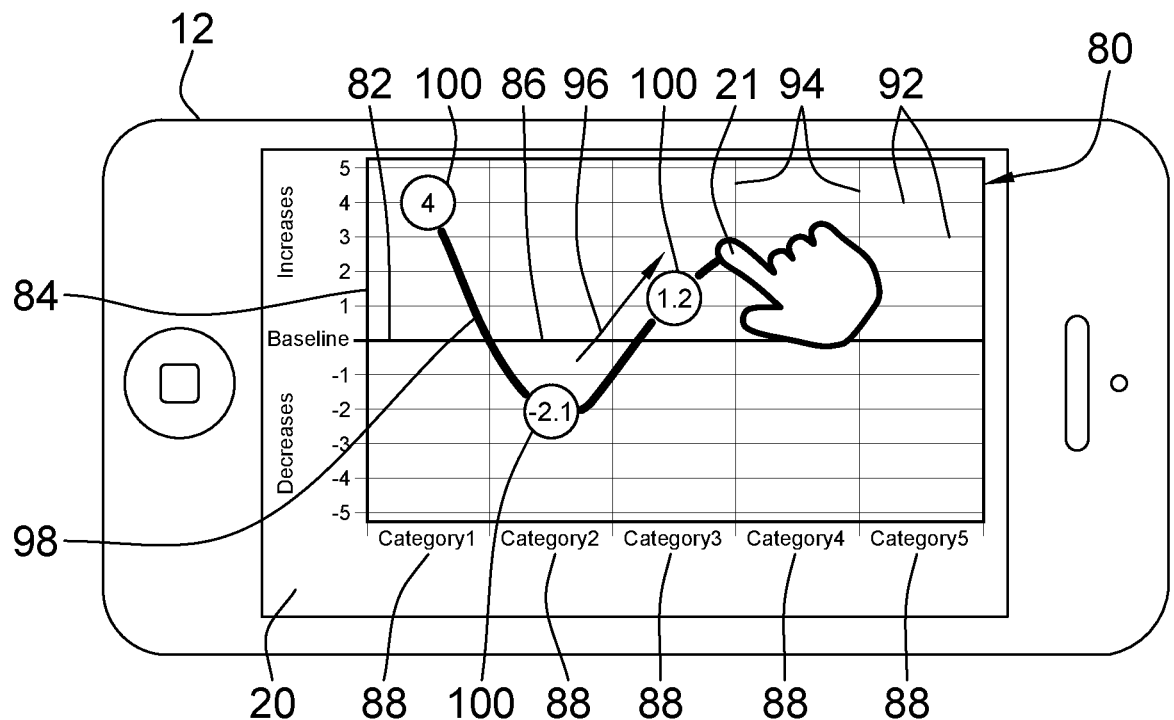
FIG. 5 is a screenshot of a user review profile line recording in progress.

Turning now to FIG. 4, the method to record and display a review profile in step 46 is set out in further detail. After a user has optionally logged in as set out above in step 42 and recorded a product ID as set out above in step 44, a user display graph 80 is provided on the user device 12 at step 62. Referring to FIG. 5, the user display graph 80 is illustrated on the display 20 of the user device 12. The user display graph 80 includes a horizontal x-axis 82 and a vertical y-axis 84, as is commonly known. As illustrated, the x-axis 82 extends from a midpoint of the y-axis 84, although it will be appreciated that the x-axis 82 may extend from any location on the y-axis 84. A baseline 86 extends along the x-axis 82. As is commonly known, a baseline commonly corresponds to a numerical y-axis value of zero, although it may correspond to any convenient basic measurement. As illustrated, the baseline 86 extends from the y-axis 84 at a location where the y-axis value is equal to zero, with the numerical values along the y-axis increasing above the baseline 86 and decreasing below the baseline 86, as is commonly known. The x-axis 82 is divided into a plurality of review categories 88. Although the present embodiment illustrates five review categories 88, it will be appreciated that more or less categories may be useful, as well. The review categories 88 may be selected to include any reviewable characteristic or effect of the consumable product. For example, review categories 88 for wine products may include fruitiness, sweetness, acidity, body and tannin, whereas review categories 88 for inhalable products may include personal effects of the product, such as energy, anxiety, insight, relaxation and happiness. It will be appreciated that the review categories 88 are dependent on the specific type of product being reviewed. As illustrated, the y-axis 84 extends between a low value of −5 and a high value of +5. It will be appreciated that the y-axis 84 could extend between any range of values, such as, by way of non-limiting example, −100 to +100 or the y-axis 84 could be split into a plurality of descriptive labels, such as, by way of non-limiting example, "always", "almost always", "sometimes", "rarely", "never" and "not applicable". The user display graph 80 may include a plurality of horizontal lines 92 spaced apart and parallel to the x-axis 82 to indicate the various review value levels and a plurality of vertical lines 94 spaced apart and parallel to the y-axis 84 to divide the plurality of review categories 88.

Turning back to FIG. 4, following display of the user display graph 80 at step 62, user input is detected at step 64. User input is received from the input device 21 and is detected when the user input is located within the user display graph 80. As illustrated in FIG. 5, the input device 21 is a user finger on a touch activated user device 12, although other input devices 21 may be used as well, as outlined above. Once user input has been detected in step 64, the system tracks the movement of the user input at step 66 along a path 98. It will be appreciated that the path 98 may also be adjusted during initial input, as will be set out below. As illustrated in FIG. 5, user input moves along the path 98 through the plurality of review categories 88 in a general left to right direction, as generally indicated at 96. It will be appreciated that the vertical movement of the user input will depend on the personal reviews of each user in each review category 88. As the user input moves through the review categories 88, a review point 100 is measured within each review category 88 at step 68. The review point 100 is measured with respect to its location relative to the y-axis 84 location where the path 98 intersects a midpoint within each review category 88 along the x-axis 82. The value of each review point 100 is measured as a numerical value corresponding to the distance from the baseline 86 to the review point 100 based on the scale of the y-axis 84. As illustrated in FIG. 5, the review point 100 in the example illustrated for the Category 1 review category 88 is measured at 4, and the review point 100 for the Category 2 review category 88 is measured at −2.1. It will be appreciated that the value of the review point 100 is dependent on each individual user and the product being reviewed. It will be appreciated that if the y-axis is divided into descriptive labels, as outlined above, the review point value may be label-based rather than numerically-based. In operation, the initial input for each review point 100 may be measured as the user tap or touches the screen at the desired location. Optionally, the initial starting point for each review point 100 may be predictively presented to the user based upon their historical ratings in each category for similar product IDs.

Figure 6:
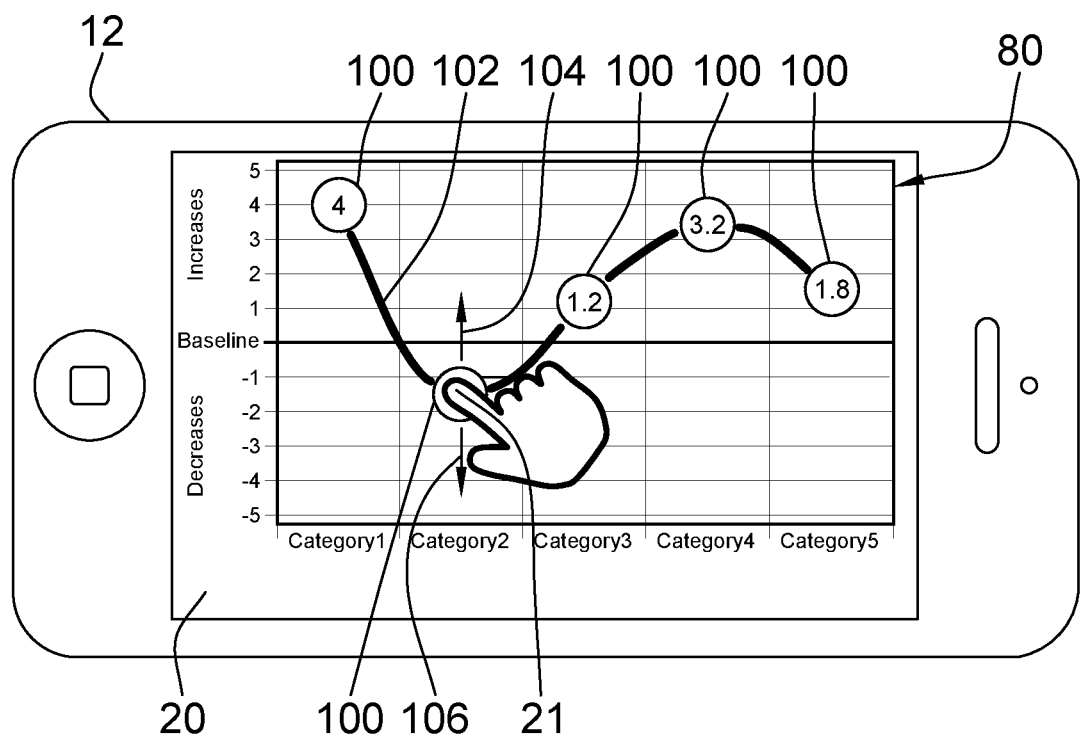
FIG. 6 is a screenshot of a user review point and profile line adjustment.

At step 70 a profile line 102 with a plurality of review points 100 is displayed on the display 20, as illustrated in FIG. 6. The profile line 102 follows the path 98 input by the user using the input device 21 at step 66. The values of the review points 100 are displayed as measured at step 68. At step 72 the system detects if there is additional user input. Additional user input may be submitted at step 74 to adjust a review point value and subsequently the shape of the profile line 102. The user may use the input device 21 to select a review point 100 and adjust the location of the review point 100 to result in an adjusted review point value. The review point 100 may be adjusted upwards or downwards, as indicated generally at 104 and 106 respectively. With an adjustment to the review point 100, the profile line 102 is adjusted in a corresponding manner such that the profile line 102 passes through the adjusted review point 100 location. The adjusted review point 100 and profile line 102 is displayed again at step 70. This process repeats until the user is satisfied with the final profile line and review point values. The user may save the final profile line 102 by any known means, such as, by way of non-limiting example, there may be a submit or save button on the display, the user may "swipe" the screen to indicate that the review is complete, or the system may be timed such that if there is no input over a specified period of time, then the review is completed and saved to the first database 17 at step 76.

Figure 7:
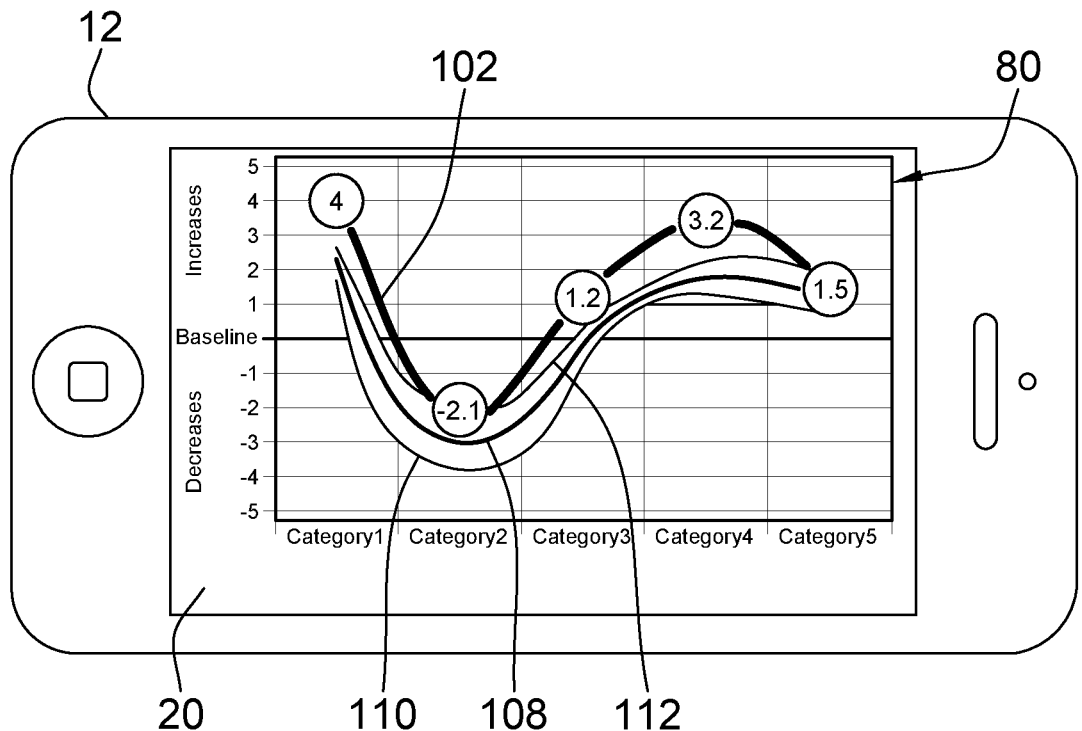
FIG. 7 is a screenshot of a user review profile line comparison.

Referring now to FIGS. 3 and 7, to compare the average review profile line 108 with the recorded profile line 102, as indicated at step 60, the profile line 102 is displayed with the average review profile line 108 at the same time. The average review profile line 108 may include a range extending between a lower limit average review profile line 110 and an upper limit average review profile line 112. It will be appreciated that other description statistics may be included as well, such as, by way of non-limiting example, the median and the mode, as are commonly known. The range may be selected to display the minimum and maximum review points for all previously recorded user reviews as stored in the second database 18, or the range may be calculated to display a standard deviation utilizing the data from all previously recorded user reviews stored in the second database 18.

Figure 8:
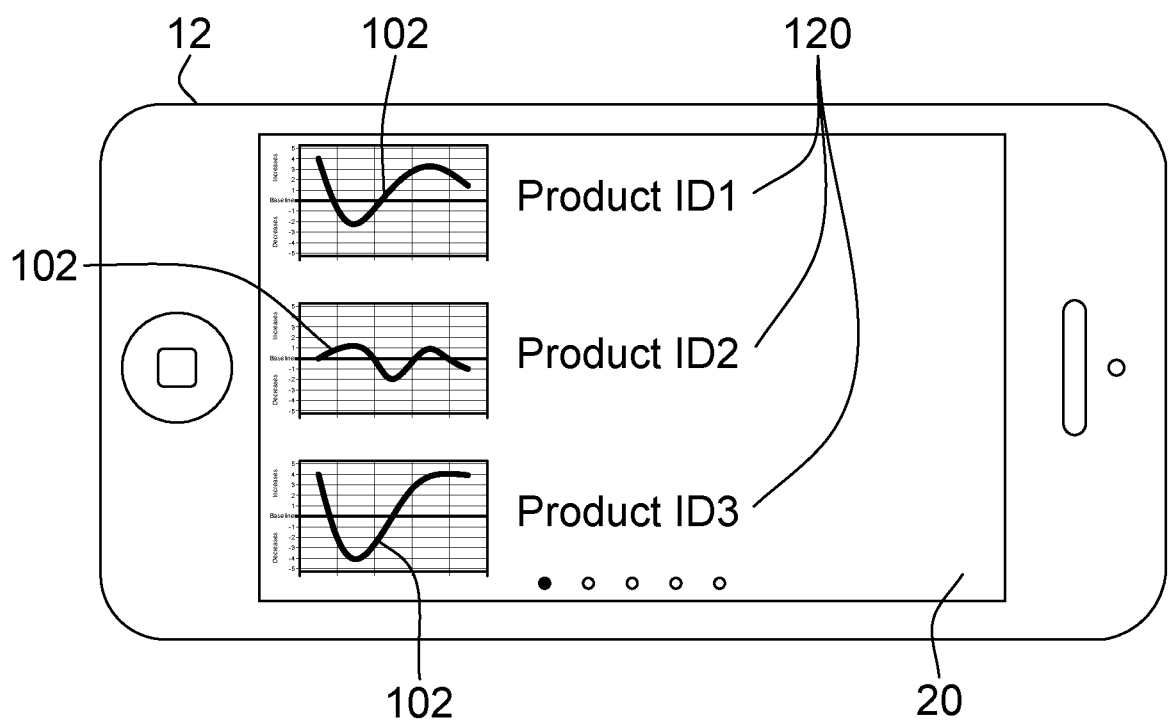
FIG. 8 is a screenshot of a list of past reviews.

Turning now to FIG. 8, a user may also view the profile lines 102 for a plurality of product IDs 120 from a plurality of past reviews, as saved in the first or second databases, 17 and 18, respectively. The user may scroll through the profile lines 102, as is commonly known in the art. It will be appreciated that the profile lines 102 on this display may be replaced by average review profile lines 108, as well. This function is useful to be able to select a product for consumption based on a desired review profile line 102 or average review profile line 108.

While specific embodiments of the invention have been described and illustrated, such embodiments should be considered illustrative of the invention only and not as limiting the invention as construed in accordance with the accompanying claims.

What is claimed is:

1. A computer-implemented method for recording, compiling and displaying user reviews of a consumable product, the method comprising:
    providing a user display graph on a user device, said user display graph having an x-axis and a y-axis with a baseline extending from said y-axis along said x-axis wherein said x-axis is divided into a plurality of review categories;
    detecting a user input from an input device within said user display graph on said user device;
    tracking the movement of said user input on said user device along a path through said plurality of review categories;
    measuring a plurality of review points on said path wherein each of said plurality of review points is located within one of said plurality of review categories;
    displaying a profile line connecting said plurality of review points along said path;
    displaying numerical values representing each of said plurality of review points within each of said plurality of review categories;
    receiving an inputted consumable product identity;
    storing said inputted consumable product identity and said plurality of review points within a database, wherein said database includes for each consumable product, said inputted consumable product identity and a plurality of user review points from a plurality of users for each of said plurality of review categories;

utilizing a processing circuit to generate an average review profile line for each consumable product of all of said plurality of user review points for each of said plurality of review categories; and displaying said average review profile line on said touch-activated user device.

2. The method of claim 1 wherein said user device comprises a touch-activated user device.

3. The method of claim 2 wherein said input device is selected from a group consisting of user finger and stylus.

4. The method of claim 1 wherein said input device is selected from a group consisting of mouse, digitizer, touchpad, pointing stick, joystick, tracking ball and light pen.

5. The method of claim 1 wherein said baseline extends from a midpoint of said y-axis.

6. The method of claim 1 wherein each of said plurality of review points is located at a midpoint of each of said plurality of review categories along said x-axis intersecting said path.

7. The method of claim 1 wherein each of said numerical values corresponds to a distance from said baseline to each of said plurality of review points.

8. The method of claim 1 wherein each of said plurality of review points is adjustable by detecting said user input at a location on said profile line corresponding to one of said plurality of review points and tracking movement of said user input parallel to said y-axis relative to said baseline so as to adjust said profile line.

9. The method of claim 1 further comprising displaying a range for each consumable product corresponding to all of said plurality of user review points for each of said plurality of review categories.

10. The method of claim 9 wherein said range extends between minimum and maximum values of said plurality of user review points for each of said plurality of review categories.

11. The method of claim 9 wherein said range is calculated as a standard deviation of said plurality of user review points for each of said plurality of review categories.

12. The method of claim 1 wherein said user device is configured to connect with said processing circuit through a network.

13. The method of claim 1 wherein said consumable product identity is selected from a plurality of consumable product identities stored within said database.

14. The method of claim 1 wherein said database is searchable.

15. The method of claim 14 wherein said database is searchable by said product identity.

16. The method of claim 14 wherein said database is searchable by said average review profile line.

17. A computer-implemented system for recording, compiling and displaying user reviews of a consumable product comprising:

a user device;

an input device;

a CPU;

a network connection;

a database storing a plurality of consumable product identities and a plurality of corresponding user review points from a plurality of users for each of a plurality of review categories;

wherein said user device is in communication with said CPU;

wherein said CPU is configured to access said database;

wherein said user device is configured to display a user display graph, said user display graph having an x-axis and a y-axis with a baseline extending from said y-axis along said x-axis wherein said x-axis is divided into a plurality of review categories;

wherein said user device is configured to detect and track user input movement on said input device along a path within said user display graph;

wherein said CPU is configured to measure a plurality of review points on said path wherein each of said plurality of review points is located within one of said plurality of review categories;

wherein said CPU is configured to generate a profile line connecting said plurality of review points along said path and to display said profile line on said touch-activated user device; and wherein said CPU is configured to generate numerical values representing each of said plurality of review points within each of said plurality of review categories and to display said numerical values on said touch-activated user device;

receiving an inputted consumable product identity;

storing said inputted consumable product identity and said plurality of review points within a database, wherein said database includes for each consumable product, said inputted consumable product identity and a plurality of user review points from a plurality of users for each of said plurality of review categories;

utilizing a processing circuit to generate an average review profile line for each consumable product of all of said plurality of user review points for each of said plurality of review categories; and displaying said average review profile line on said touch-activated user device.

18. The system of claim 17 further comprising a network connection.

19. The system of claim 18 wherein said user device is in communication with said CPU through said network connection.

* * * * *